United States Patent
Ebihara et al.

(10) Patent No.: US 9,856,095 B2
(45) Date of Patent: Jan. 2, 2018

(54) SYSTEM CAPABLE OF IMMEDIATELY PERFORMING OPERATION ON WORKPIECE

(71) Applicant: FANUC Corporation, Yamanashi (JP)

(72) Inventors: Kenzo Ebihara, Yamanashi (JP); Takayuki Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/003,977

(22) Filed: Jan. 22, 2016

(65) Prior Publication Data

US 2016/0214805 A1    Jul. 28, 2016

(30) Foreign Application Priority Data

Jan. 23, 2015    (JP) ................................ 2015-011364

(51) Int. Cl.
| | |
|---|---|
| *B23Q 11/14* | (2006.01) |
| *B65G 47/90* | (2006.01) |
| *B23Q 7/04* | (2006.01) |
| *B23Q 7/10* | (2006.01) |
| *B23Q 11/08* | (2006.01) |
| *B23Q 17/00* | (2006.01) |

(52) U.S. Cl.
CPC ............. *B65G 47/905* (2013.01); *B23Q 7/04* (2013.01); *B23Q 7/10* (2013.01); *B23Q 11/0891* (2013.01); *B23Q 11/148* (2013.01); *B23Q 17/00* (2013.01); *B23Q 2707/003* (2013.01)

(58) Field of Classification Search
CPC .................................................... B23Q 11/148
USPC ................................ 52/741.1, 745.19, 749.1
See application file for complete search history.

(56) References Cited

U.S. PATENT DOCUMENTS

| | | | |
|---|---|---|---|
| 5,146,977 A | 9/1992 | Kiser | |
| 6,675,549 B1* | 1/2004 | Kaneda | B23Q 11/10 409/135 |
| 2008/0166213 A1* | 7/2008 | Hunter | H01L 21/68 414/754 |
| 2011/0291030 A1* | 12/2011 | Lee | H01J 37/185 250/492.21 |

(Continued)

FOREIGN PATENT DOCUMENTS

| | | |
|---|---|---|
| JP | 64-50040 U | 3/1989 |
| JP | 2001-322049 A | 11/2001 |

(Continued)

OTHER PUBLICATIONS

Office Action in JP Application No. 2015-011364, dated Mar. 15, 2016.

*Primary Examiner* — Anna Momper
*Assistant Examiner* — Ronald Jarrett
(74) *Attorney, Agent, or Firm* — Hauptman Ham, LLP (57) ABSTRACT

A precision machining/measurement device and a robot that conveys a workpiece to the device are covered by a cover, and a space covered by the cover is partitioned by a partition cover into a space where the precision machining/measurement device is installed and a space where the robot is installed. When a temperature inside the space where the robot is installed falls within a predetermined temperature range, a door provided in the partition cover is opened, and the robot supplies the workpiece to the precision machining/measurement device through the opened door.

6 Claims, 5 Drawing Sheets

(56) References Cited

U.S. PATENT DOCUMENTS

2015/0225189 A1* 8/2015 Ebner .................. B21J 1/06
72/419

FOREIGN PATENT DOCUMENTS

| JP | 2002-200539 A | 7/2002 |
| JP | 2004-237372 A | 8/2004 |
| JP | 2008-284615 A | 11/2008 |

* cited by examiner

SYSTEM CAPABLE OF IMMEDIATELY PERFORMING OPERATION ON WORKPIECE

RELATED APPLICATIONS

The present application claims priority to Japanese Application Number 2015-011364, filed Jan. 23, 2015, the disclosure of which is hereby incorporated by reference herein in its entirety.

BACKGROUND OF THE INVENTION

1. Field of the Invention

The present invention relates to a system capable of immediately performing work on a workpiece.

2. Description of the Related Art

In a device, such as a machine tool or a measurement device, that performs work on a workpiece, a variation in ambient temperature at an installation site may influence machining or measurement results. Particularly, in a device such as a machine tool or a measurement device that requires accurate position control and performs work on a workpiece, it is common to conduct temperature management for suppressing the temperature variation at an installation environment. Further, there may be adopted a configuration in which a device that performs work on a workpiece is covered by a cover, and an inside of the cover is kept at a constant temperature by using an air conditioner.

In a case where a device that performs work on a workpiece, which is covered by a cover for automation, is used in combination with a robot, an openable door for robot access is provided in the cover so that a workpiece, a tool, a measurement probe, and the like can be supplied to, or removed from, the device by the robot. When the device that performs work on a workpiece, such as machine tool or a measurement device, is operated, the door for robot access provided in the cover is temporarily opened.

As described above, in a case where the device that performs work on a workpiece, in which the cover is used to control the ambient temperature to a prescribed temperature, is robotized, it is necessary to open and close the door provided in the cover so that the robot may access the device to supply or remove the tool, measurement probe, and the like, thereto or therefrom.

When the door is opened, a temperature at the inside of the cover in which the device that performs work on a workpiece is installed is varied by air outside the cover, which is warmed by the robot that generates heat. Thus, after completion of the robot access and door close, it is necessary to wait until the temperature inside the cover returns to the prescribed value in order to make the device that performs work on a workpiece execute accurate machining or measurement operation.

Japanese Patent Application Laid-Open No. 2001-322049 discloses a device in which a cleaning robot having a nozzle for sucking chips on a tip of an arm is provided on a moving body such as a cross rail and a spindle head of a machine tool, wherein a moving path is designed in which the nozzle is moved in an area to suck the chips within a time determined by a machining program when the tool machines a workpiece, and the cleaning robot is controlled by outputting only the path data on the non-interference area except the interference area with the tool during the machining so as to suck and discharge the chips. The aforementioned prior art document discloses a configuration combining the robot and machining tool, but does not provide a configuration that prevents influence of heat generated by the robot on the device that performs work on a workpiece installed inside the cover.

SUMMARY OF THE INVENTION

An object of the present invention is therefore to provide a system capable of reducing a variation in temperature inside the cover covering the device that performs work on a workpiece and then allowing the device that performs work on a workpiece to become operable immediately after the door provided in the cover is closed.

A system according to the present invention includes: a device that performs work on a workpiece; a robot that conveys the workpiece to an area where the device performs the work; a cover that covers the device and the robot; a partition cover that partitions a space covered by the cover into a first space where the robot is installed and a second space where the device that performs work on the workpiece is installed; an open/close mechanism that opens and closes a door provided in the partition cover; and a controller that actuates the open/close mechanism to open the door when a temperature inside the first space falls within a predetermined value range.

Conventionally, when a temperature inside the main chamber is varied due to opening of the door provided in the second space, it is necessary to wait until the temperature inside the main chamber returns to the set value in order to achieve accurate machining or measurement. According to the present invention, a variation in the temperature inside the main chamber upon the door open is small, making it possible for the device that performs work on a workpiece to become operable immediately after the door closes.

The system may further include: a first air conditioner that controls a temperature inside the first space to a constant temperature; and a second air conditioner that controls a temperature inside the second space to a constant temperature, and when the temperature inside the first space falls within a set temperature range with respect to the temperature inside the second space, the open/close mechanism may be actuated to open the door.

According to this embodiment, the door can be made openable/closable only when a difference between the first and second spaces falls within a set value range.

Air controlled in temperature may be blown against the workpiece disposed in the first space through a vent hole of the first air conditioner so as to control a temperature of the workpiece.

According to this embodiment, cost becomes lower than a case where the temperature of the workpiece is controlled by another heat source.

The robot may be used to rearrange the workpieces such that a workpiece to be machined earliest is closest to the vent hole.

According to this embodiment, the workpiece can be controlled in temperature efficiently.

The system may further include a measurement unit that measures the temperature of the workpiece existing inside the first space, and when the temperature of the workpiece falls within a predetermined temperature range, the open/close mechanism may be actuated to open the door so as to allow the robot to convey the workpiece to the device that performs work on the workpiece.

According to this embodiment, presence of a difference between the temperature of the workpiece to be machined and temperature inside the cover prevents achievement of accurate machining or measurement. The workpiece is carried into the first space from outside, so that it may take time for the workpiece to fit with the temperature inside the first space. According to the present invention, the temperature of the workpiece is directly measured and, only when the temperature thereof becomes close to the temperature inside the second space, the workpiece is supplied to the device that performs work on a workpiece by the robot, thereby allowing achievement of accurate machining/measurement.

The system may further include a base on which the device that performs work on the workpiece, the robot, the cover, and the partition cover are installed, and the base may be placed on a vibration eliminating device.

In the device that performs work on a workpiece, such as a machining tool or measurement device, a floor vibration in the installation place may influence measurement results. For precision devices, installation thereof on a base provided with a vibration eliminating device may reduce influence of the floor vibration. According to the this embodiment, in a case where the device that performs work on a workpiece is combined with the robot for automation, the device and robot are placed on a base provided with the vibration eliminating device, thereby preventing relative positions thereof from being changed.

According to the present invention, there can be provided a system capable of reducing a variation in temperature inside the cover covering the device that performs work on a workpiece and then allowing the device that performs work on a workpiece to become operable immediately after the door provided in the cover is closed.

BRIEF DESCRIPTION OF THE DRAWINGS

The above and other objects and features of the present invention will become apparent from the following description made with reference to the accompanying drawings, in which.

DETAILED DESCRIPTION OF THE PREFERRED EMBODIMENTS

In the present invention, a space (main chamber) where a device that performs work on a workpiece is covered by a cover is air-conditioned by an air conditioner, and a space (front chamber) where a robot is covered by a cover is also air-conditioned by an air conditioner. Then, a temperature inside the main chamber and a temperature inside the front chamber are monitored and, only when a difference therebetween is equal to or less than a set value, a door of the main chamber is made openable/closable. The temperatures of the front chamber and main chamber may be measured by temperature sensors attached thereto, respectively, or by temperature sensors provided in respective air conditioners. The temperature of the workpiece measured in the front chamber may be regarded as the temperature inside the front chamber.

When the temperature inside the main chamber is varied due to opening of the door provided in the partition cover, it is necessary to wait until the temperature inside the main chamber returns to the set value in order to achieve accurate machining or measurement. According to the present invention, a variation in the temperature inside the main chamber upon the open of the door provided in the partition cover is small, making it possible for the device that performs work on a workpiece to become operable immediately after the door close. As an example of the device that performs work on a workpiece to which the system of the present invention is applied, a precision lathe 10 illustrated in FIG. 1 and a precision three-dimensional measurement device 40 illustrated in FIG. 2 can be taken.

First, a first embodiment of a system capable of immediately performing work on a workpiece according to the present invention will be described using FIGS. 1A and 1B. In this embodiment, as a device that performs work on a workpiece, which constitutes the system, a precision lathe is used.

Figure 1A:
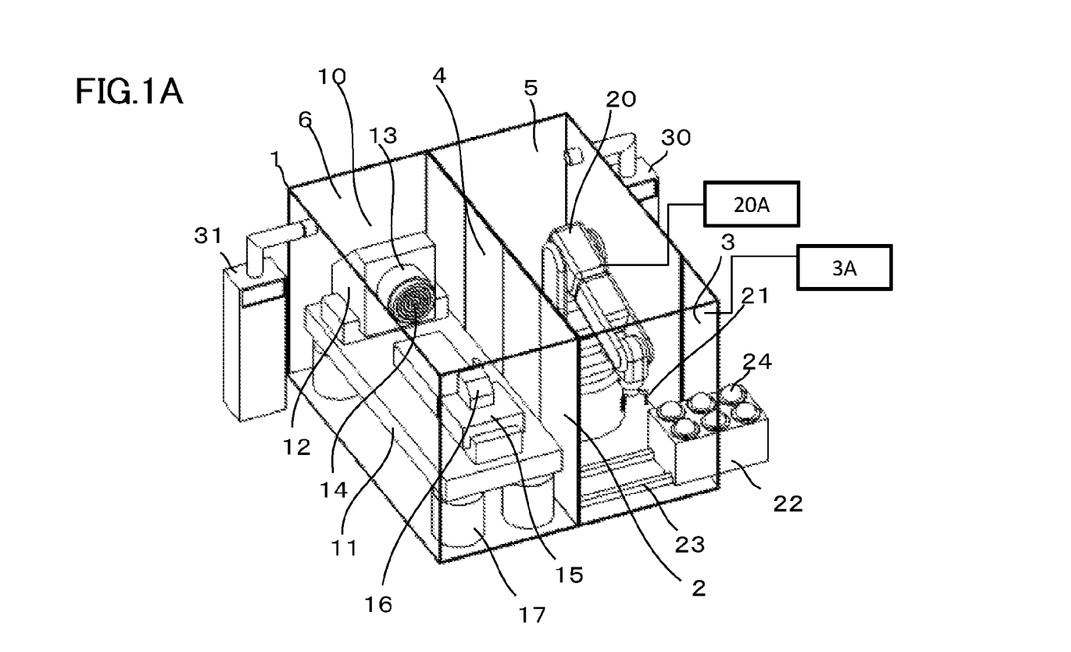
FIGS. 1A and 1B are views illustrating a first embodiment of a system capable of immediately performing work on a workpiece according to the present invention.

In FIG. 1A, a first door 3 to be opened and closed by a first open/close mechanism (not shown) is in an open state, through which a workpiece 24 is supplied from outside the device to a front chamber 5, and a second door 4 to be opened and closed by a second open/close mechanism (not shown) is in an closed state to isolate the front chamber 5 and a main chamber 6 from each other.

The front chamber 5 and main chamber 6 are formed by a cover 1. A space defined by the cover 1 is partitioned by a partition cover 2 into the front chamber (first space) 5 and main chamber (second space) 6. The cover 1 has an opening portion, to which the first door 3 configured to be freely opened by the first open/close mechanism (not shown) is attached. The partition cover 2 has an opening portion, to which the second door 4 configured to be freely opened by the second open/close mechanism (not shown) is attached.

A precision lathe 10 is a device that performs work on a workpiece installed in the main chamber 6 and includes a main spindle 13, which is fitted to an X-axis slide 12 on a base 11 and to which the workpiece 24 is detachably fixed, and a tool rest 16 with tool fitted to a Z-axis slide 15. The precision lathe 10 is installed on a vibration-free table 17 serving as a vibration absorbing device in this embodiment. The workpiece 24 is fixed, through a vacuum chuck 14, to the main spindle 13 on the X-axis slide 12, and a tool (not shown) is fixed to the tool rest 16 with tool on the Z-axis slide 15. In this state, machining is performed on the workpiece 24 by rotations of the X- and Z-axes and rotation of the main spindle 13.

A robot 20 is installed in the front chamber 5. The robot 20 carries the workpiece 24 to/from the precision lathe 10. A workpiece conveyor 22 moves from outside the cover 1 to the front chamber 5 on a rail 23 and, thereby, the workpiece 24 is carried in to the front chamber 5. The robot 20 uses a robot hand 21 fitted to a leading end of an arm thereof to hold the workpiece 24 carried by the workpiece conveyor 22 and supplies the workpiece 24 to the precision lathe 10 in the main chamber 6.

The robot 20 is controlled by a robot controller 20A, and the precision lathe 10 is controlled by a precision lathe controller (not shown). In the embodiments of the present invention, the robot controller and precision lathe controller exchange information therebetween.

The first and second open/close mechanisms each constituted by a motor are controlled by a door open/close controller 3A that controls open/close operation of the first and second doors 3 and 4. The door open/close controller, robot controller, and precision lathe controller exchange information therebetween. A function of the door open/close controller may be incorporated in the robot controller or a controller for the device that performs work on a workpiece.

The front chamber 5 in which the robot 20 is installed and main chamber 6 in which the precision lathe 10 (device that performs work on a workpiece) is installed are each controlled in temperature by an air conditioner (first air conditioner 30, second air conditioner 31). The first air conditioner 30 sucks air in the front chamber 5 through a pipeline, heats (or cools) the sucked air, and returns the resultant air to the front chamber 5. By measuring a temperature of the sucked air, a temperature in the front chamber 5 can be grasped. The second air conditioner 31 sucks air in the main chamber 6 through a pipeline, heats (or cools) the sucked air, and returns the resultant air to the main chamber 6. By measuring a temperature of the sucked air, a temperature in the main chamber 6 can be grasped. The first and second air conditioners 30 and 31 are controlled by air-conditioning controllers (not shown), respectively. Temperature sensors (not shown) may be provided in the front chamber 5 and main chamber 6, respectively for temperature measurement.

In order to perform precise machining using the precision lathe 10, the temperature inside the main chamber 6 is kept at a constant temperature by the second air conditioner 31. The temperature inside the front chamber 5 is kept at a temperature close to that inside the main chamber 6 by the first air conditioner 30. Only when the temperature inside the front chamber 5 falls within a set temperature range with respect to the temperature inside the main chamber 6, the second door 4 driven by the second open/close mechanism can be opened and, only in this case, the robot 20 installed in the front chamber 5 can carry the workpiece 24 to the precision lathe 10.

Figure 1B:
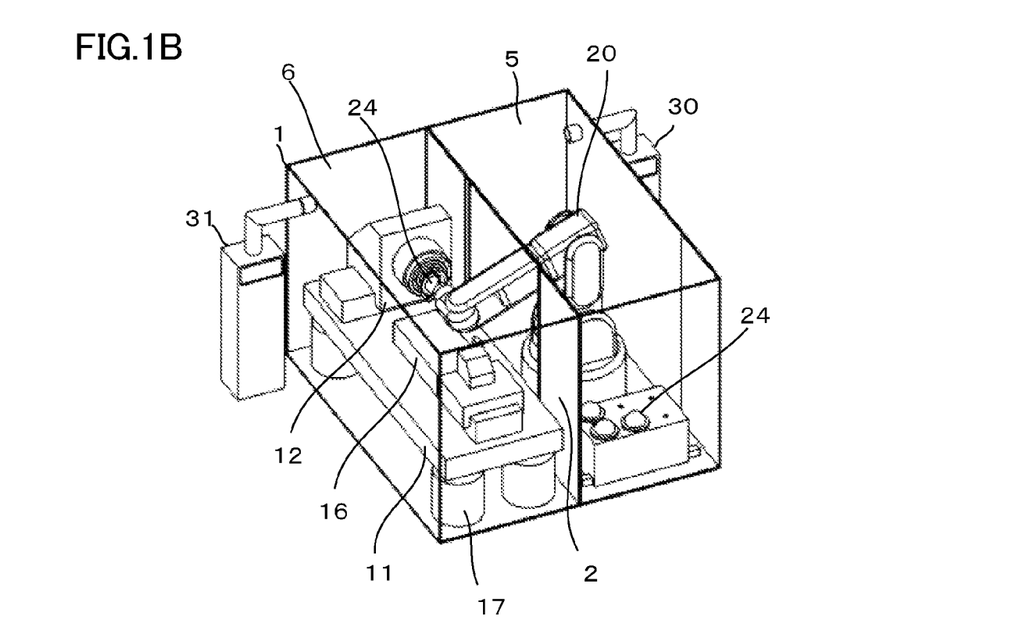

FIG. 1B illustrates a configuration in which the first door 3 is closed by the first open/close mechanism, and the second door 4 is opened by the second open/close mechanism, and the robot 20 installed in the front chamber 5 attaches the workpiece 24 to the precision lathe 10 that performs work on a workpiece inside the main chamber 6.

When the temperature inside the front chamber 5 falls within a temperature range set with respect to the temperature inside the main chamber 6, the second door 4 is opened by the second open/close mechanism, as illustrated in FIG. 1B. The robot 20 holds the workpiece 24 conveyed by the workpiece conveyor 22 situated in the front chamber 5 and fixes the workpiece 24 to the main spindle 13 of the precision lathe 10 installed in the main chamber 6 through the vacuum chuck 14.

Next, a second embodiment of a system capable of immediately performing work on a workpiece according to the present invention will be described using FIG. 2. In this embodiment, as a device that performs work on a workpiece, which constitutes the system, a precision three-dimensional measurement device is used.

As in the system described using FIGS. 1A and 1B, the system according to the second embodiment includes the robot 20, cover 1, front chamber 5, main chamber 6, first air conditioner 30, and second air conditioner 31. A Z-axis (front-rear slide 42) is mounted on a Y-axis (up-down slide 43) on a base 41 placed on a vibration-free table 46, a measurement probe 45 of a precision three-dimensional measurement device 40 fitted to a leading end of the Z-axis (front-rear slide 42) is brought into contact with the workpiece 24 to measure a shape thereof. Further, there is mounted, on the base 41, a rotary table 44 to which the workpiece 24 is fixed through a vacuum chuck (not shown).

Figure 2:
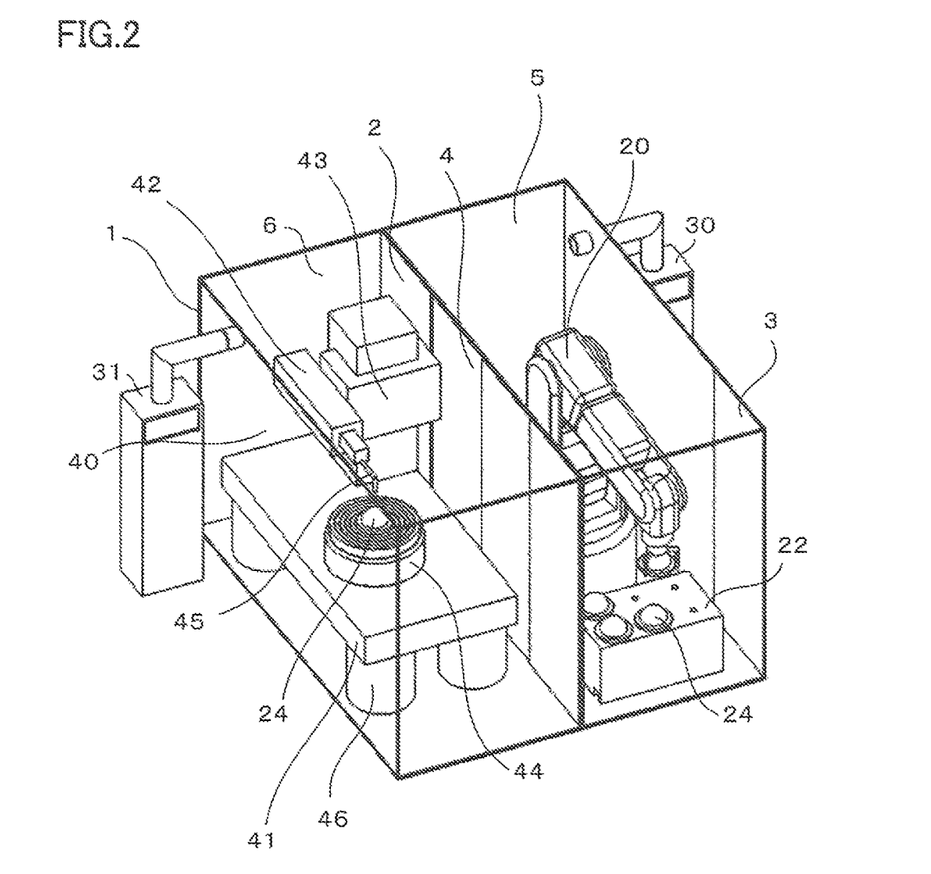
FIG. 2 is a view illustrating a second embodiment of a system capable of immediately performing work on a workpiece according to the present invention.

The precision three-dimensional measurement device 40 illustrated in FIG. 2, as the device that performs work on a workpiece, includes various precision measurement devices including noncontact measuring instruments, such as a CCD camera, an electrostatic capacity displacement meter, a laser measurement device, and a white interference measurement device. The robot 20 can be applied not only to workpiece replacement, but also to various automation operations that can be executed on the precision three-dimensional measurement device 40, such as probe replacement or air blow.

Next, a third embodiment of a system capable of immediately performing work on a workpiece according to the present invention will be described using FIG. 3. In this embodiment, a precision lathe as a device that performs work on a workpiece is mounted on a base provided with a vibration eliminating device (that is, on a base placed on a vibration-free table) together with the robot.

Figure 3:
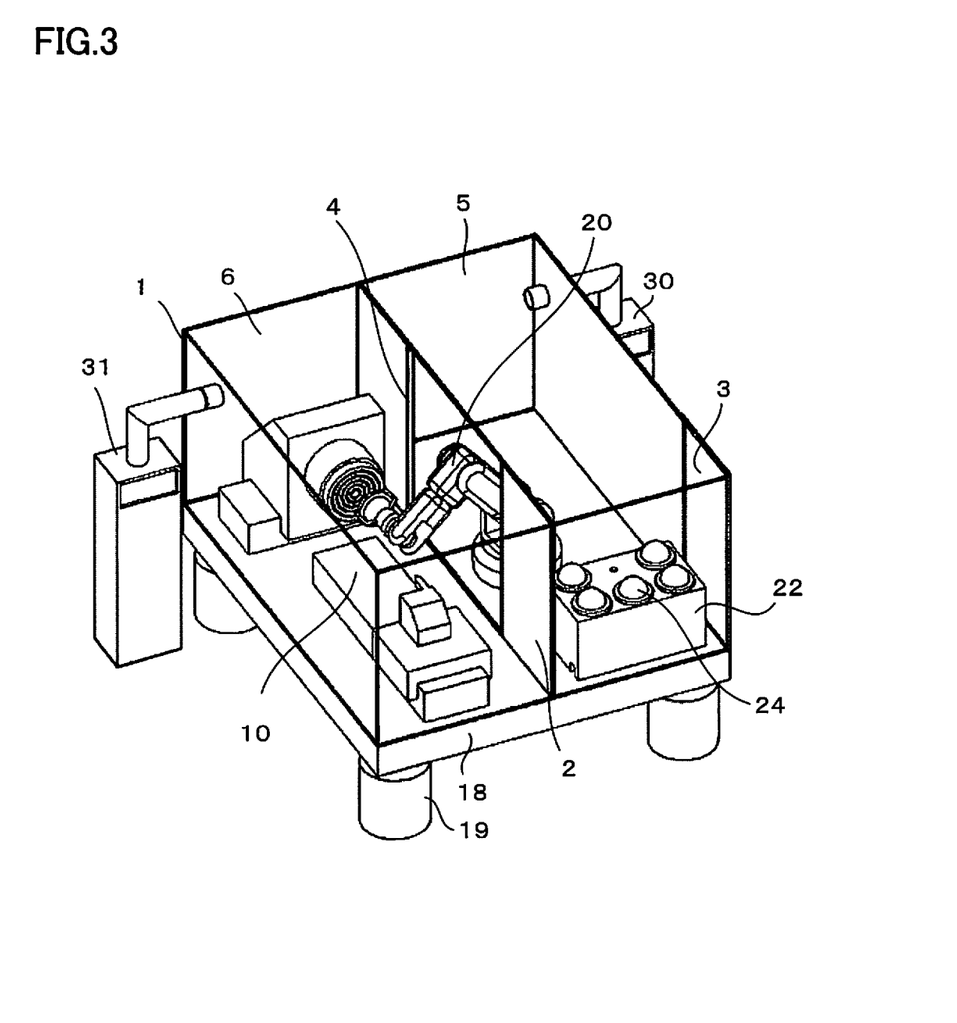
FIG. 3 is a view illustrating a third embodiment of a system capable of immediately performing work on a workpiece according to the present invention.

As illustrated in FIG. 3, when the robot 20 is mounted on a base 18 placed on a vibration-free table 19, a reach of an arm of the robot 20 required for replacement of the workpiece 24 can be made smaller than a case where the robot 20 is installed on a floor, so that it is possible to make the robot 20 compact in size by the corresponding amount, which offers an advantage in cost. Further, an occupied area of the robot 20 with respect to the floor is reduced, so that an installation area of the entire system can be reduced. Further, the vibration-free table 19 has often no reproducibility in position (posture); however, when the robot 20 is installed on the base 18, relative coordinates of the robot 20 and workpiece 24 which are placed on the vibration-free table 19 are uniquely determined, irrespective of the position (posture) of the vibration-free table 19, by accurate position control of restive axes. When the vacuum chuck is used, it is necessary to make a workpiece center and a spindle center coincide accurately with each other and, therefore, it is important to realize workpiece attachment/detachment exhibiting high positional reproducibility.

Next, a fourth embodiment of a system capable of immediately performing work on a workpiece according to the present invention will be described using FIG. 4. In this embodiment, air controlled to a constant temperature in the front chamber is directly blown against the workpiece.

Figure 4:
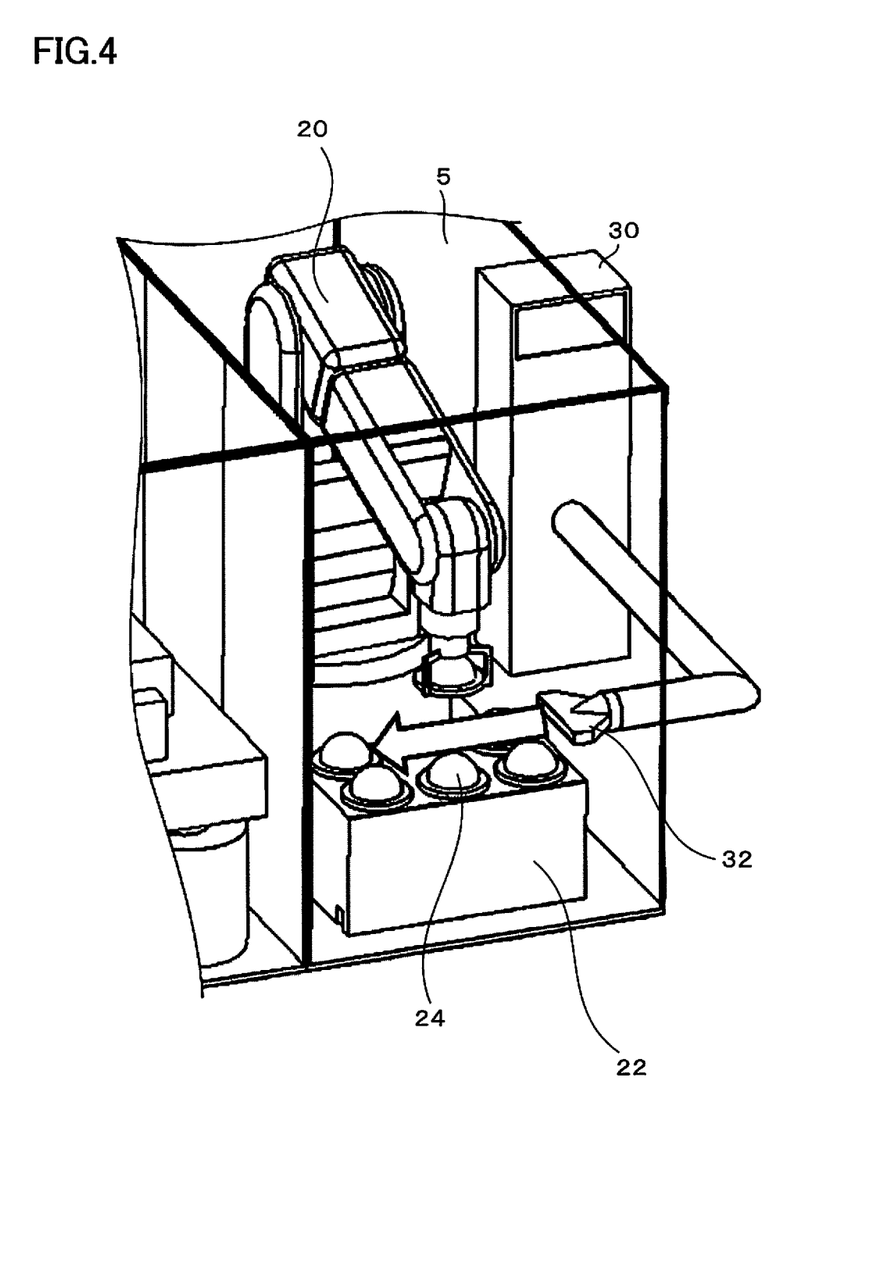
FIG. 4 is a view illustrating a fourth embodiment of a system capable of immediately performing work on a workpiece according to the present invention.

In this embodiment, as illustrated in FIG. 4, a vent hole 32 of the first air conditioner 30 for the front chamber 5 is disposed near the workpiece 24. Air controlled to a constant temperature to be discharged through the vent hole 32 is directly blown against the workpiece 24, whereby it is possible to bring a temperature of the workpiece 24 close to a setting temperature of the front chamber 5 at low cost and with efficiency. That is, open/close control of the second door 4 is performed with the temperature of the workpiece 24 regarded as the temperature of the front chamber 5. By using the robot 20 to rearrange the workpieces 24 on the workpiece conveyor 22 such that a workpiece 24 to be machined earliest is closest to the vent hole 32, it is possible to bring the temperature of the individual workpiece 24 close to the setting temperature of the front chamber 5 effectively.

Next, a fifth embodiment of a system capable of immediately performing work on a workpiece according to the present invention will be described using FIG. 5. In this embodiment, a temperature sensor in the front chamber is used to directly measure the temperature of the workpiece.

Figure 5:
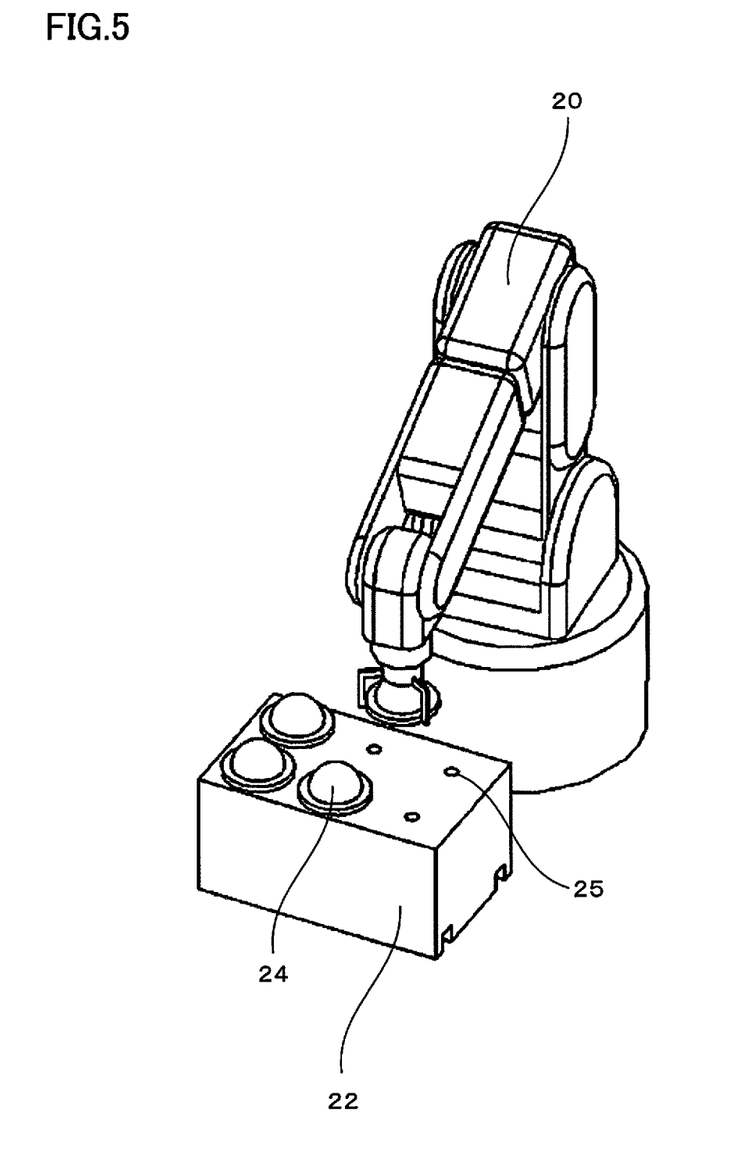
FIG. 5 is a view illustrating a fifth embodiment of a system capable of immediately performing work on a workpiece according to the present invention.

FIG. 5 is a view illustrating the robot 20 installed inside the front chamber 5. A temperature sensor 25 is used to directly measure the temperature of the workpiece 24 placed on the workpiece conveyor 22. When the temperature of the workpiece 24 falls within a set value range, the second door 4 is opened by the second open/close mechanism, and the robot 20 illustrated in FIG. 5 supplies the workpiece 24 to the device that performs work on a workpiece (precise lathe 10). A dimension of the workpiece 24 is increased/decreased under influence of the temperature, so that it is important to supply a workpiece 24 having a temperature close to that inside the main chamber 6 in order to achieve accurate machining/measurement.

According to the present invention, when the temperature inside the cover is varied due to opening of the door provided in the cover, it is necessary to wait until the temperature inside the cover returns to the set value in order to achieve accurate machining or measurement. According to the present invention, a variation in the temperature inside the cover upon the door open is small, making it possible for the device that performs work on a workpiece to become operable immediately after the door closes.

The invention claimed is:

1. A system, comprising:
a device configured to perform work on a workpiece;
a robot configured to convey the workpiece to an area where the device performs the work;
a cover that covers the device and the robot;
a partition cover that partitions a space covered by the cover into a first space where the robot is installed and a second space where the device is installed;
a door provided in the partition cover;
a first controller configured to control an operation of the door to open the door when a temperature inside the first space falls within a predetermined value range;
a first air conditioner configured to control the temperature inside the first space to a constant temperature, wherein
the first air conditioner includes a vent hole configured to blow temperature-controlled air into the first space,
the first air conditioner further includes a duct extending into the first space,
the duct penetrates a wall of the first space, and
the vent hole is provided at an end of the duct in the first space; and
a workpiece conveyor provided within the first space and in front of the vent hole of the first air conditioner, wherein,
the workpiece is one among a plurality of workpieces conveyed by the workpiece conveyor to be sequentially machined by the work performed by the device,
a second controller to control the robot to rearrange the plurality of workpieces on the workpiece conveyor in a manner that, among the plurality of workpieces on the conveyor, a workpiece to be machined earliest is located closest to the vent hole, and
the first air conditioner is configured to blow, through the vent hole, the temperature-controlled air directly against the workpiece arranged by the robot and disposed in the first space closest to the vent hole.

2. The system according to claim 1, further comprising:
a second air conditioner configured to control a temperature inside the second space to a constant temperature, wherein
when the temperature inside the first space falls within a set temperature range with respect to the temperature inside the second space, the first controller is configured to control the operation of the door to open the door.

3. The system according to claim 1, further comprising a measurement unit configured to measure a temperature of the workpiece existing inside the first space and being disposed closest to the vent hole, wherein
when the measured temperature of the workpiece falls within a predetermined temperature range, the first controller is configured to control the operation of the door to open the door and cause the robot to convey the workpiece through the opened door to the device.

4. The system according to claim 1, further comprising a base on which the device, the robot, the cover, and the partition cover are installed, wherein
the base is placed on a vibration absorbing device.

5. The system according to claim 1, wherein the first controller is further configured to control the operation of the door to open the door when a temperature of the workpiece, which is located closest to the vent hole of the conveyor, falls within a predetermined value range.

6. The system according to claim 1, wherein the wall of the first space that the duct penetrates is opposite to the partition cover.

* * * * *